H. Wydler
Inventor
By: Glascock Downing & Seebold
Attys

April 5, 1938.　　　　H. WYDLER　　　　2,113,526
PISTON METER FOR LIQUIDS
Filed Nov. 11, 1936　　　2 Sheets-Sheet 2
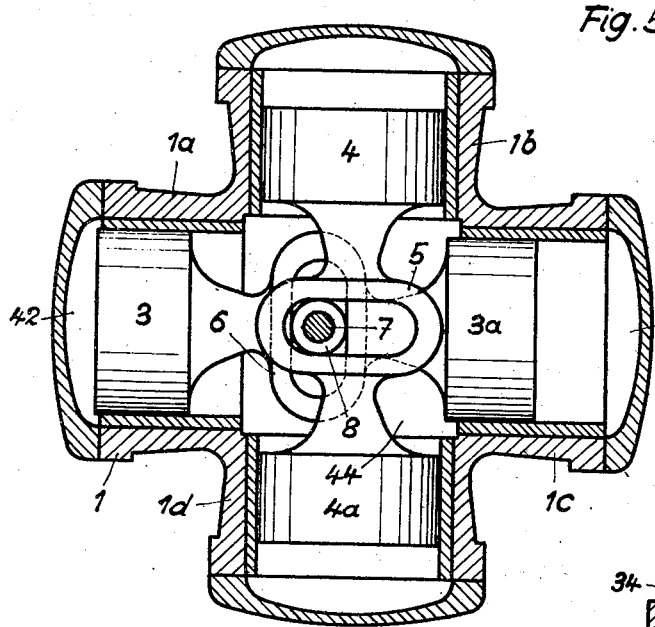
Fig. 3.
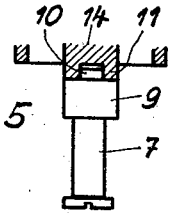
Fig. 5.
Fig. 6.
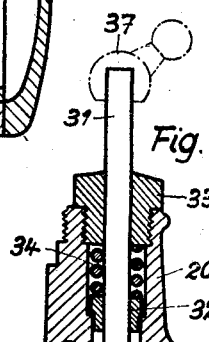
Fig. 7.
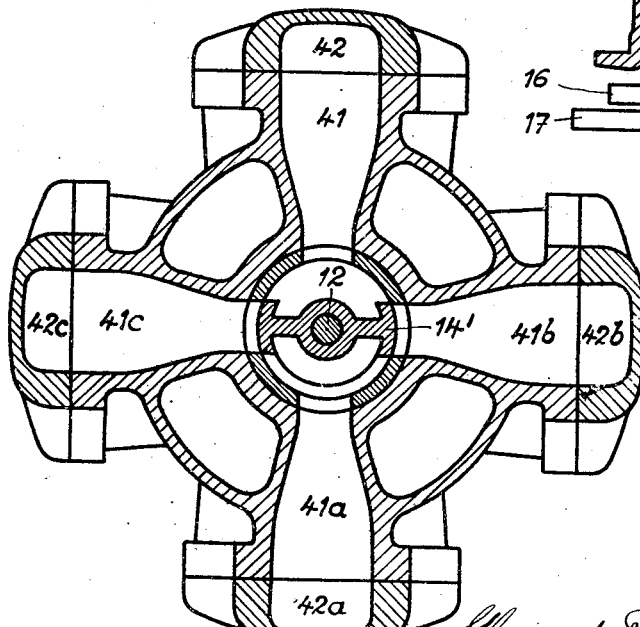
Fig. 4.
H. Wydler
INVENTOR
By Glascock Downing & Seebold
ATTYS.

Patented Apr. 5, 1938

2,113,526

UNITED STATES PATENT OFFICE 2,113,526

PISTON METER FOR LIQUIDS

Hermann Wydler, Berne, Switzerland, assignor to the firm Sauser A.-G., Soleure, Switzerland, a joint-stock company of Switzerland Application November 11, 1936, Serial No. 110,335
In Switzerland March 9, 1936

2 Claims. (Cl. 221—101)

The present invention relates to a piston meter for liquids of the kind having two pairs of oppositely arranged cylinders with pistons radiating from a central chamber and crossing each other at a right angle, the pistons of each pair having a piston rod in common provided with a widened central slotted portion.

The invention consists in a peculiar arrangement of parts avoiding all possibility of jamming and all unnecessary play or rapid wear with a view of securing a very accurate metering of liquids such as benzine. Besides the parts are shaped to permit their making by means of spray or injecting casting needing no machining when put together.

The invention principally consists in that the crankshaft is suspended in a ball bearing and utilized as a distributing member which member constitutes at the same time a further bearing of the shaft, this shaft carrying also a cam disk which, in cooperation with a manually operated controlling shaft, serves as means for controlling the starting or the stopping of the apparatus.

Figure 1:
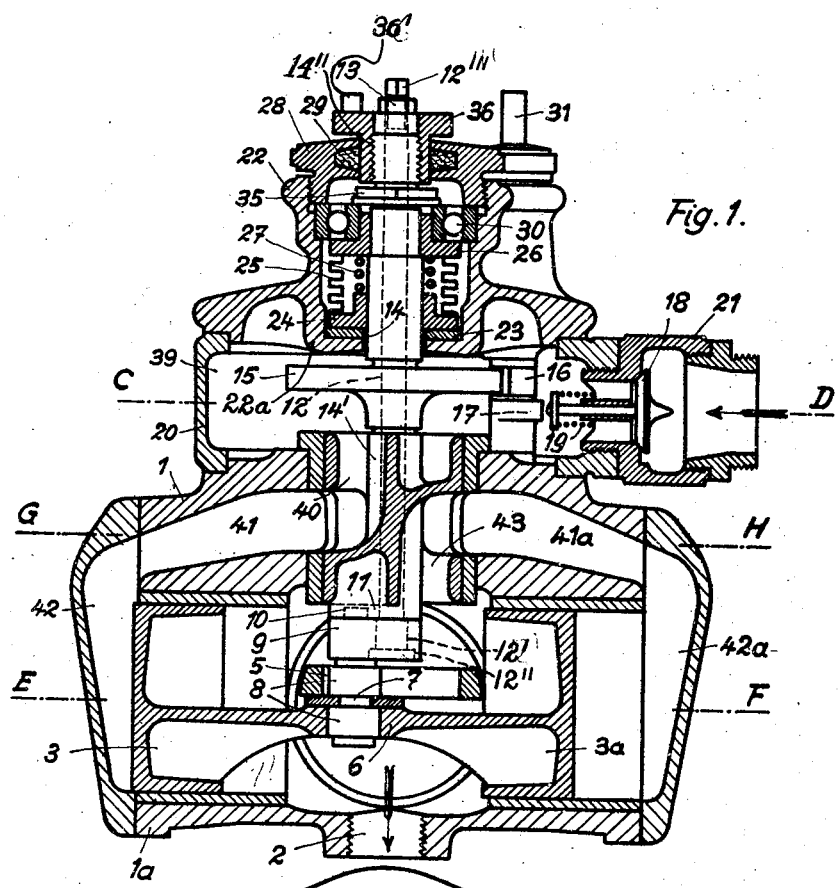
Figure 2:
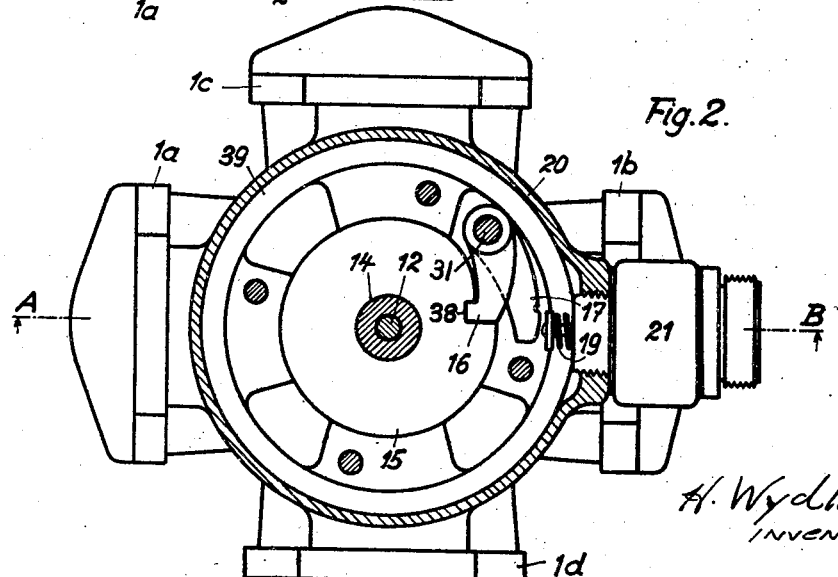

In the annexed drawings one embodiment of the invention is shown as an example. Therein is:

Fig. 1 a sectional view on line A—B, of Fig. 2.
Fig. 2 a sectional view on line C—D, of Fig. 1.
Fig. 3 a sectional view on line E—F, of Fig. 1.
Fig. 4 a sectional view on line G—H, of Fig. 1.
Figs. 5 and 6 show details of the crank.
Fig. 7 is a sectional view of a stuffing box at the lower end of a controlling shaft carrying a pawl and an arm.

The piston meter comprises a main casing 1 formed by the four cylinders 1a, 1b, 1c and 1d. The discharge of the measured liquid is effected by the neck 2 at the bottom of said casing. The pistons 3 and 3a, 4 and 4a are rigidly connected in one piece and possess at their median portions slots 5 and 6 as guiding means for a common crank pin 7 provided with friction rollers 8. These rollers are held back on pin 7 by means of a screw 7', while pin 7 is made in one piece with crank 9 and carrier pin 10 slidably fitted into a slot 11 of cock plug 14'. This plug and a cam disk 15 and a cylindrical, shouldered portion ending with a threaded portion 14'' are all in one piece, made for instance by spray casting, and constitute together the shaft 14. Crank 9 is kept engaged in the plug 14' by means of a screw bolt 12 which is axially arranged within shaft 14 and is fitted with an eccentric swelling 12' into the crank 9. Bolt 12 keeps by means of a head 12'' and a threaded portion provided with a nut 13 the crank in close contact with said plug 14', a squared end 12''' of bolt 12 serving to adjust the eccentric portion 12' within the crank 9 with the view of changing the stroke of the said pistons.

Cam disk 15 is in operative relation to a pawl 16 and an arm 17, both are fast to a hand operated shaft 14 in the cover 22 which closes the intermediate casing 20 and supports the obturation means of the shaft 14. While pawl 16 serves for blocking the meter, the arm 17 serves for opening the liquid admission valve 18 which normally is kept closed by a spring 19 and is disposed in the admission neck 21 of the meter. As shown in Figs. 1 and 2 the apparatus is blocked by said pawl in both directions of rotation. Said obturation is effected by plates 23 and 24 whereof the first plate is supported by the bottom of a pocket 22a formed in the cover of the casing and the latter is connected to a corrugated tubular diaphragm 25 and to the gland 26 which is fast to shaft 14 and rotates with this shaft, an intermediate spring 27 pressing the plates 23 and 24 together. A cap 28 is provided with a groove filled with felt 29 as an obturation of the bearing 30 against the outside. At the same time the cap 28 serves for tightening the ball bearing 30. The crank shaft 14 is seated in said ball bearing and screwed fast by the nut 35 to the inner race of the ball bearing and to the gland 26 so that the whole shaft is supported by the ball bearing 30. The coupling gland 36 serves as intermediate driving member of the counter. The pawl 16 and the arm 17 are fast to an auxiliary shaft 31 which is journalled in the casing 1 and the cover 22. A stuffing box 32 comprising a gland 33 compressing with a spring 34 and stuffing material obturates shaft 31. A handle 37 serves as operating means for this shaft.

If liquid has to be discharged from the meter, shaft 31 must be turned by the handle 37. Thereby valve 18 is lifted through arm 17 and liquid will be admitted to the measuring pistons. Likewise by turning the shaft 31 pawl 16 will be lifted from its engagement with the notch 38 of the cam disk 15, thereby rendering possible a rotation of said disk in an anticlockwise direction. The liquid is now admitted from valve 18 to the annular space 39 and from here to the passage 40 of shaft 14 and from these to the intermediate passageway 41, to the space 42 above the piston 3 and pushes the same back to cause through the slotted crank guides 5 and 6 the rotation of the crank 7. The liquid above the piston 3a is pressed into the space 42a and then into the passage way 41a so as to flow into the discharge passage way 43 of the crank shaft 14 and from there into the interior space 44 of the main casing 1 to the outlet 2. In exactly the same manner the piston 4 and 4a will cooperate with the passage ways 41b and 41c. By the revolving of the crank shaft 14 the admission and discharge passage ways 40 and 43 will be displaced in a synchronous manner with the displacement of the pistons so that at each revolution of the crank a given quantity of liquid will be measured. When the handle 37 is released pawl 16 under the effect of spring 19 and arm 17 will make contact with the cam disk 15 and if this disk continues revolving the valve 18, while pawl 16 is gliding along the retreating edge of the disk, will be slowly closed until pawl 16 has dropped into the recess 38 and has stopped a further revolving of the shaft. Thereby it is possible to retail a determined quantity of liquid without heeding the position of a counter or of the hand of a dial. The operation of the counter may be effected by an upstanding lug 36' provided on the gland 36. A change of the quantity of liquid at each revolution of the shaft may be obtained by changing the stroke of the pistons. This may be done by turning the eccentric portion 12' of screw bolt 12 within the crank 9 for a suitable angle. Thereby the crank will be displaced radially in the face of cock plug 14' and carrier pin 10 will slide accordingly within slot 11 for a corresponding distance.

What I claim is:—

1. In a reciprocating piston meter of the kind having two pairs of oppositely arranged cylinders with pistons radiating from a central chamber and crossing each other at a right angle, the pistons of each pair having a piston rod in common and provided with a widened central slotted portion, in combination, a casing enclosing said cylinders and having an outlet neck at the bottom, a superposed intermediate casing with an inlet neck and a cover provided with a central pocket, a vertical crank shaft suspended within said pocket and engaging with a single crank pin the two slotted portions of the piston rods, a ball bearing constituting the suspension means of the shaft and having the outer race fast to the cover and the inner race clamped to the shaft and supported by elastic means resting on the bottom of said pocket, a cylindrical plug integral with the shaft formed as a distributing valve and serving as a bearing, and an additional bearing at the top end of the shaft provided with a felt obturation.

2. In a reciprocating piston meter according to claim 1 and in combination a recessed cam disk integral with said crank shaft facing the inlet neck of the intermediate casing, a spring controlled liquid admission valve controlling the liquid admission through said neck, and a hand operated auxiliary shaft with pawls adapted to serve as cooperating means between said recessed cam disk and the valve stem of said admission valve to control the starting and the blocking of the apparatus.

HERMANN WYDLER.